United States Patent [19]  
Bassett et al.

[11] Patent Number: 5,321,416  
[45] Date of Patent: Jun. 14, 1994

[54] HEAD-MOUNTED VISUAL DISPLAY APPARATUS

[75] Inventors: Bruce R. Bassett, Sunnyvale; Kenneth Pimentel, Sausalito; Peter A. Ronzani, Los Gatos, all of Calif.

[73] Assignee: Virtual Research Systems, Santa Clara, Calif.

[21] Appl. No.: 919,486
[22] Filed: Jul. 27, 1992
[51] Int. Cl.$^5$ .......................... H04N 5/66; H04N 7/18
[52] U.S. Cl. ...................................... 345/8; 348/121; 348/795; 348/61
[58] Field of Search .................... 358/88, 93, 104, 230, 358/241, 254, 3; 340/705; 2/417, 418; 345/8; H04N 5/66, 7/18

[56] References Cited

U.S. PATENT DOCUMENTS

| | | | |
|---|---|---|---|
| 3,059,519 | 10/1962 | Stanton | 88/1 |
| 4,231,117 | 11/1980 | Aileo | 2/6 |
| 4,257,062 | 3/1981 | Meredith | 340/705 |
| 4,446,480 | 5/1984 | Breglia et al. | 340/705 |
| 4,797,736 | 1/1989 | Kloots et al. | 358/93 |
| 4,897,715 | 1/1990 | Beamon, III | 358/88 |
| 4,902,116 | 2/1990 | Ellis | 350/501 |
| 4,933,755 | 6/1990 | Dahl et al. | 358/88 |
| 4,942,628 | 7/1990 | Freund | 2/417 |
| 4,952,024 | 8/1990 | Gale | 350/143 |
| 4,961,626 | 10/1990 | Fournier, Jr. et al. | 340/705 |
| 4,982,278 | 1/1991 | Dahl et al. | 358/88 |
| 5,039,035 | 8/1991 | Fitzpatrick | 244/122 O |
| 5,189,512 | 2/1993 | Cameron et al. | 358/93 |

OTHER PUBLICATIONS

Sutherland, "A Head-Mounted Three Dimensional Display", *Proceedings of the AFIPS Fall Joint Computer Conference*, 1968, pp. 757-764.
Bibliography pg. from "A Literature Review of Virtual Environment Display Systems," by Filer, *A 3-D Virtual Environment Display System*, MS thesis, AFIT/GCS/ENG/89D-2, School of Eng., Air Force Inst. of Tech. (AU), Wright-Patterson AFB, Ohio, Dec. 1989.
Starks, "Stereoscopic video and the quest for virtual reality: an annotated bibliography of selected topics," *SPIE: Stereoscopic Displays & Applns II* 1991) 1457:327-342.
Fisher et al., "Virtual Environment Display System," *ACM 1986 Workshop on Interactive 3D Graphics*, Oct. 23-24, Chapel Hill, N.C.
Fisher et al., "Virtual Interface Environment Workstations," *Proceedings of the Human Factors Soceity 32nd Annual Meeting*, Oct. 24-28, 1988, Anaheim, Calif., pp. 91-95.
Fisher, "Virtual Environments, Personal Simulation & Tele-presence," Oct. 1989, NASA Ames Research Center.
Unknown author, "3. Integrated Helmet Systems 'With Second Sensor'," *SPIE: Large-Screen-Projection, Avionic, and Helmet-Mounted Displays* (1991) 1456:111-123.
Burbridge et al., "Hardware Improvements to the Helmet Mounted Projector on the Visual Display Research Tool (VDRT) at the Naval Training Systems Center," *SPIE: Helmet-Mounted Displays* (1989) 1116:52-60.
CAE Electronics LTD. product announcement, "Fiber-Optic Helmet Mounted Display," Saint-Laurent Quebec, Canada.
LEEP Systems, Inc. product announcement, "Cyberface II," Waltham, Mass., Feb. 1992.
VPL Research product announcement, "RB2 Virtual Reality System," Redwood City, Calif. Mar. 1991.
Brill, "Facing Interface Issues," *Computer Graphics World* Apr. 1992, pp. 48-58.

Primary Examiner—Howard W. Britton
Assistant Examiner—Richard Lee

[57] ABSTRACT

A head-mounted visual display apparatus for displaying an image generated by an image generator to a wearer of the apparatus. The visual display apparatus comprises a helmet (10) comprising a shell and a headband (66) engaged to an interior surface of the shell; an adjustment mechanism (90) mounted to an exterior surface of the helmet for adjusting the size of the headband; and a video display (18,20) housed within the helmet and connected to the image generator for displaying the image. In a preferred embodiment the adjustment mechanism includes a knob (90) mounted on an exterior surface of the shell and connected to the headband by a rotatable shaft (99) disposed through the shell between the knob and the headband.

12 Claims, 4 Drawing Sheets

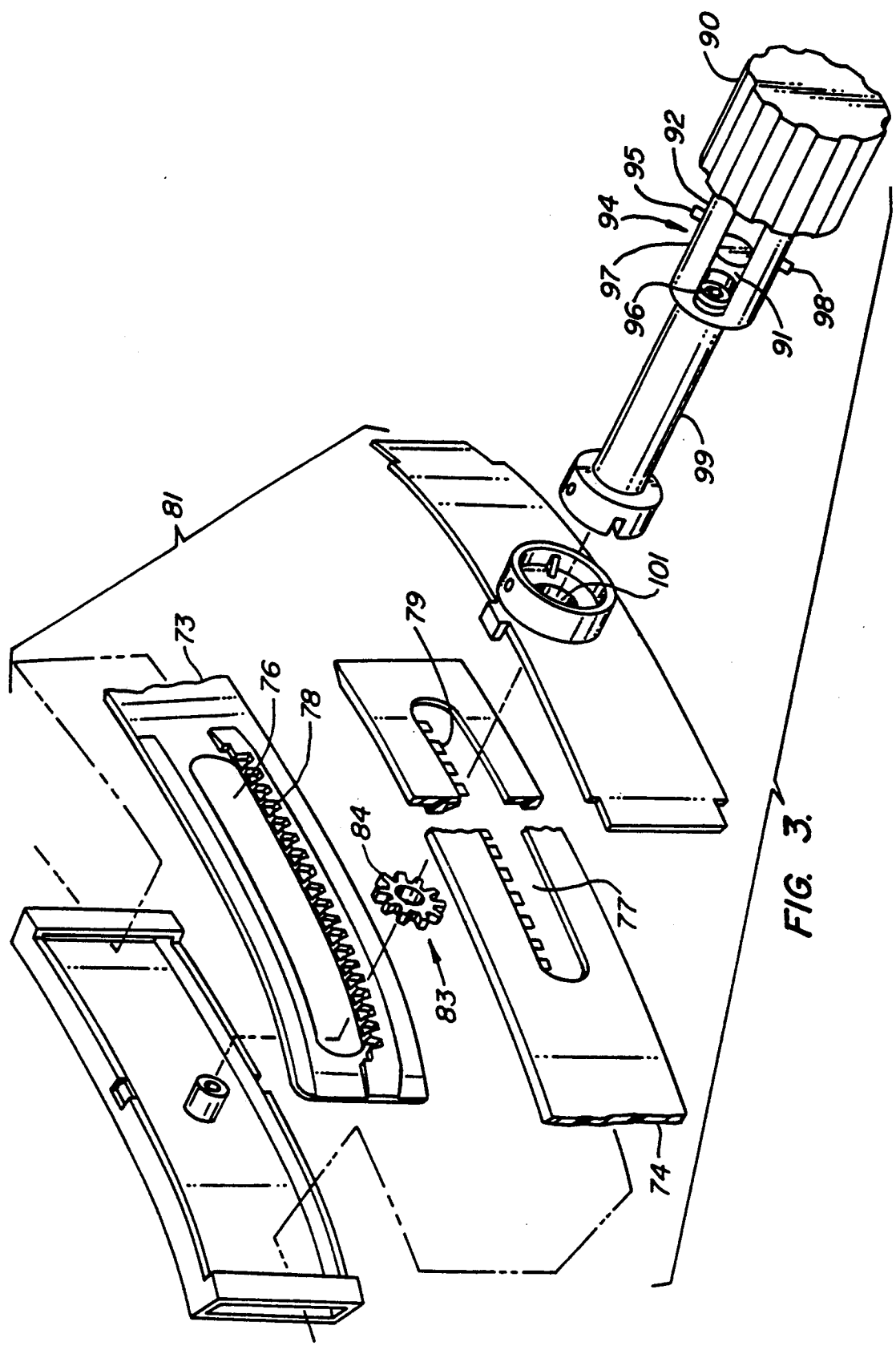

HEAD-MOUNTED VISUAL DISPLAY APPARATUS

BACKGROUND OF THE INVENTION

The present invention relates generally to the art of computer generated images and more particularly to a head-mounted display apparatus.

A virtual environmental display apparatus presents the viewer with an image, usually three dimensional, which changes as he/she moves. Computer generated images of an external scene (such as a view from the cockpit of a plane for flight simulation purposes) are presented on an LCD, cathode-ray tube, or similar display device. A position sensor attached to the viewer's head tracks the movement of the head and produces signals that are incorporated in the computation means which generate the image, to alter the image consistently with the alterations that would occur if the scene being simulated were being viewed directly. Thus, the viewer has the optical illusion of actually being in a computer generated "virtual" environment.

Typically, the display system, position sensor and other software are coupled to a head-mount that is placed on the viewer's head and connected to the computer that generates the image. One problem with present systems is that the poor ergonomics of the head-mounted display detract from the realism of the image. In some prior systems, the apparatus is very heavy and the weight is not balanced appropriately. The display system often outweighs the other components and, therefore, causes the head-mount to be too heavy in front. Thus, the viewer will grow uncomfortable after wearing the device for any length of time and, in some instances, the head-mount tends to tip forward. Another problem with the prior helmets is that such typical helmets are often extremely difficult to adjust, often requiring the user to take the helmet off his/her head and adjust it to the correct size. In addition, an important aspect of creating a virtual environment is providing a head-mount that will change shape to conform to various forehead sizes while maintaining a constant distance between the display and the viewer's eyes.

For these reasons, a head-mounted display apparatus is desired which is light weight and carefully balanced so that the viewer is comfortable while wearing the helmet for a long time. It is further desired that the helmet can be adjusted by an external mechanism so that the viewer can put the helmet on and adjust the size of the helmet easily. Preferably, the helmet will conform to various head shapes without changing the distance between the display and the viewer's eyes so that an optimal viewing position will be achieved for all viewers.

SUMMARY OF THE INVENTION

The present invention provides a head-mounted visual display apparatus for viewing an image. The display can be comfortably worn for long periods of time and can be adjusted to fit various head sizes by an external mechanism.

According to one aspect of the invention, the apparatus comprises a helmet, a video display within the helmet for displaying a computer generated image, a sensor coupled to the helmet for sensing the position and orientation of the helmet, and a visual image generator connected to the sensor and the display means for generating an image representing a simulated view in the direction of the viewer's instantaneous line of view. In a specific embodiment, the helmet comprises a circular headband with two ends that overlap each other. An external knob mounted to an exterior surface of the helmet turns a rotatable shaft that extends through a hole in the back of the helmet. The rotatable shaft engages a cogwheel coupled to the headband that, in turn, moves the two ends of the headband in opposite directions, thereby adjusting the diameter of the headband.

The external knob allows the viewer to easily adjust the helmet while the helmet is on the viewer's head. Earphones pivotally coupled to the headband automatically move towards the viewer's ears when the headband is tightened. Thus, the viewer can be surrounded by a computer generated world by simply placing the helmet on his/her head and turning an external knob. In addition, the front portion of the headband is flexibly attached to the helmet. Therefore, the headband changes shape to accommodate various forehead sizes, but the distance between the viewer's eyes and the display means does not substantially change.

The ergonomics of the helmet are also improved over the prior art. According to a specific aspect of the invention, the helmet and all of the components housed within it weigh less than 4 lbs. In addition, the components of the apparatus are positioned within the helmet such that the apparatus has a center of gravity located at approximately the midpoint of the headband (midpoint of the viewer's head). Therefore, the helmet is balanced such that the viewer may comfortably wear it for long periods of time. Moreover, a single piece helmet with only one cable connection point allows greater freedom of movement and contributes to the realism of the computer generated image.

A further understanding of the nature and advantages of the invention may be realized by reference to the remaining portions of the specification and the drawings.

BRIEF DESCRIPTION OF THE DRAWINGS

FIG. 3 is an exploded view of the adjusting mechanism of FIG. 2B;

DESCRIPTION OF THE SPECIFIC EMBODIMENT

The head-mounted virtual environment display apparatus will be described in detail in conjunction with FIGS. 1–4.

Figure 1:
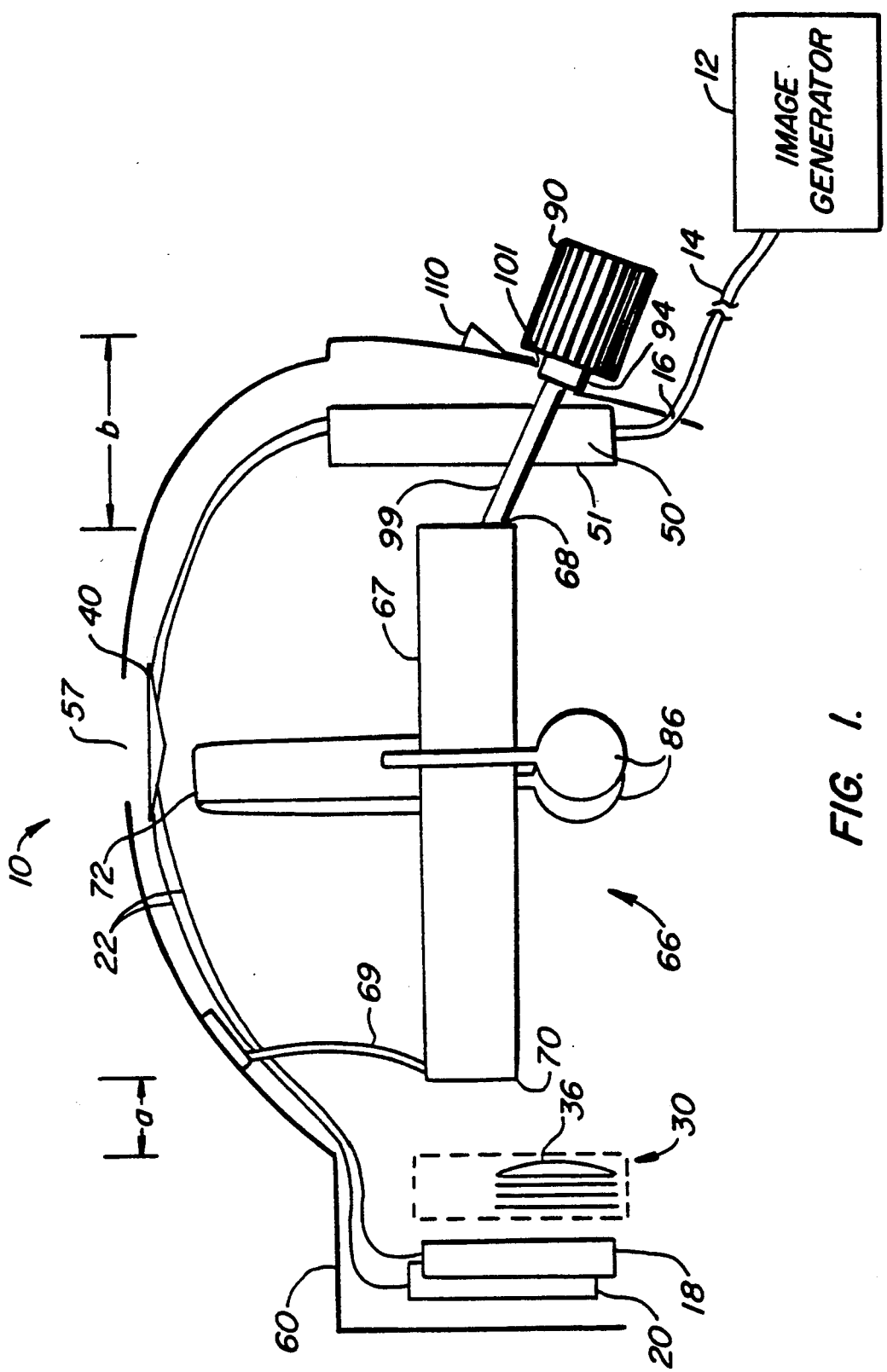
FIG. 1 is a side view showing a partially cutaway view of a head-mounted visual display apparatus in accordance with the principles of the present invention.

FIG. 1 shows the apparatus according to the invention for generating and displaying a three-dimensional image. Helmet 10 is connected to image generator 12 by cable 14 running through aperture 16 in the back of the helmet 10. Drive circuitry 50 housed in plastic cover 51 mounted to the back of the helmet 10 receives signals from the image generator 12 and converts them into a display. Color LCD displays 18, 20 display the image through optics system 30 to the eyes of the viewer. The LCD displays 18, 20 and the optics system 30 are mounted in a frame in front portion 60 of the helmet 10. Head position sensor 40 coupled to the top portion of the helmet 10 senses the position and orientation of the helmet 10. The image generator 12 creates a new image corresponding to the current position and orientation of the helmet 10 based on the signals given by the position sensor 40.

The helmet 10 is based on a single unitized shell constructed of plastic and designed to accommodate variable head sizes. The entire helmet 10 including all of the necessary components mounted inside (except for the cable 14) only weighs 1.67 kg or 3 lbs, 11 oz. In addition, the helmet 10 houses all of the necessary components and the viewer is only attached to an exterior point by the cable 14 in the back of the helmet 10. Thus, the helmet 10 is not heavy or cumbersome and the viewer may move around relatively unrestricted during operation of the visual display apparatus. The present invention, however, is not limited to a fully enclosed helmet as described above. For example, the helmet 10 could be a more open structure (for ventilation purposes) such that it has the shape of a headband with a top portion fitting over the viewer's head and a circular portion fitting around the viewer's head.

The helmet 10 comprises circular headband 66 mounted to the interior surface of the helmet 10 for fitting around the viewer's head and adjusting to various head sizes. The headband 66 in the preferred embodiment is a ratchet headband such as W.W. Grainger Part No. 67200 (by North Safety Equipment). The adjustable portion of the helmet, however, does not necessarily have to be a headband 66 as any type of engagement surface will be suitable for the present invention. The headband 66 is constructed in one piece with circular portion 67 for fitting around the viewer's head and top portion 72 for fitting over the top of the viewer's head. The headband 66 is removably mounted to the interior surface of the helmet 10 by screws 70, 71 and flexible member 69 attached to the front section of the circular portion 67. The flexible member 69 holds the front section of the circular portion 67 of the headband 66 substantially fixed, but allows for some flexibility. Thus, the front of the headband 66 is free to change shape to accommodate different forehead sizes. However, the distance between the viewer's eyes and the LCD displays 18, 20 does not substantially change.

Figure 2A:
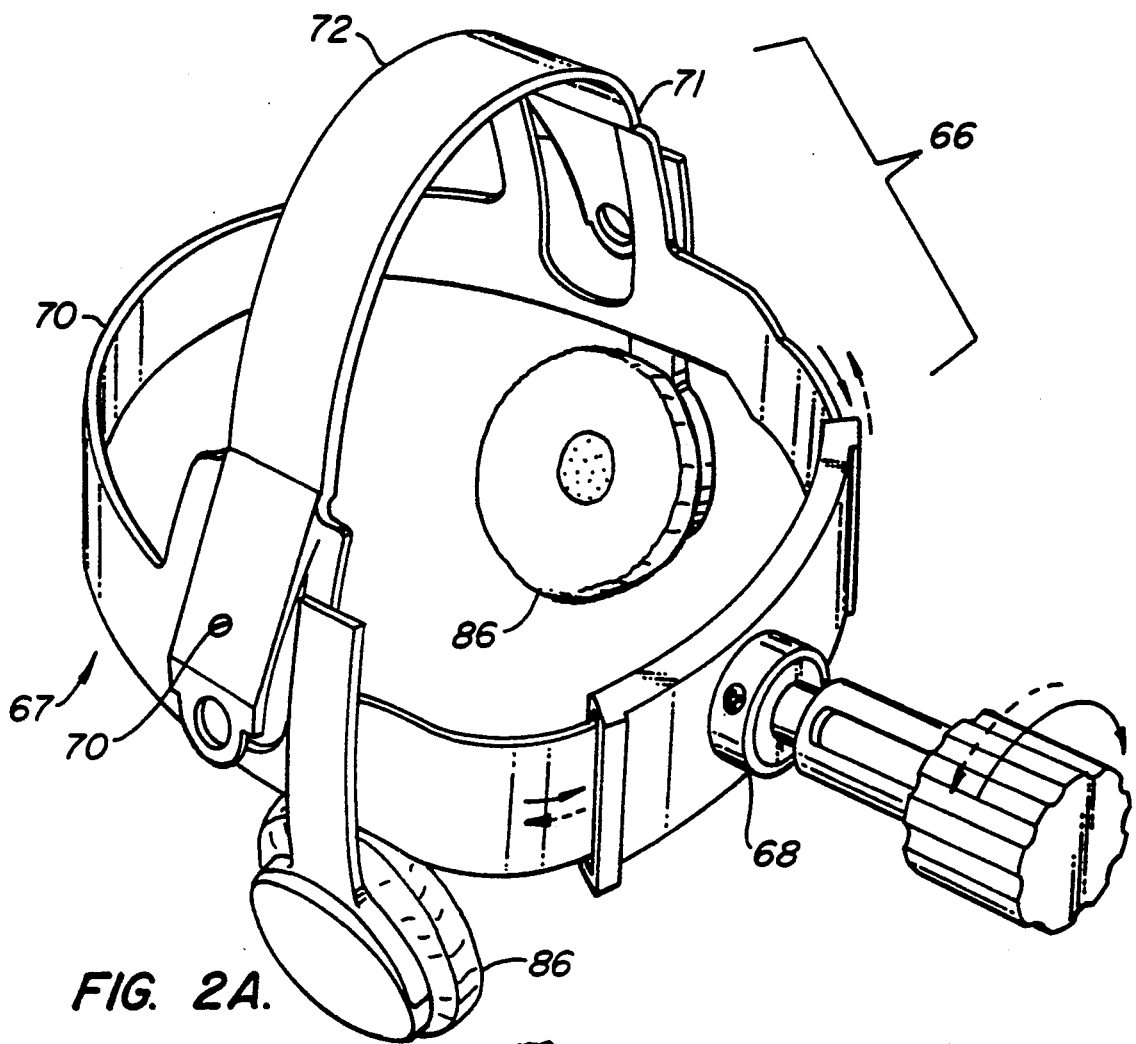
FIG. 2A is a top view of the headband and the adjusting mechanism of the apparatus of FIG. 1.
Figure 2B:
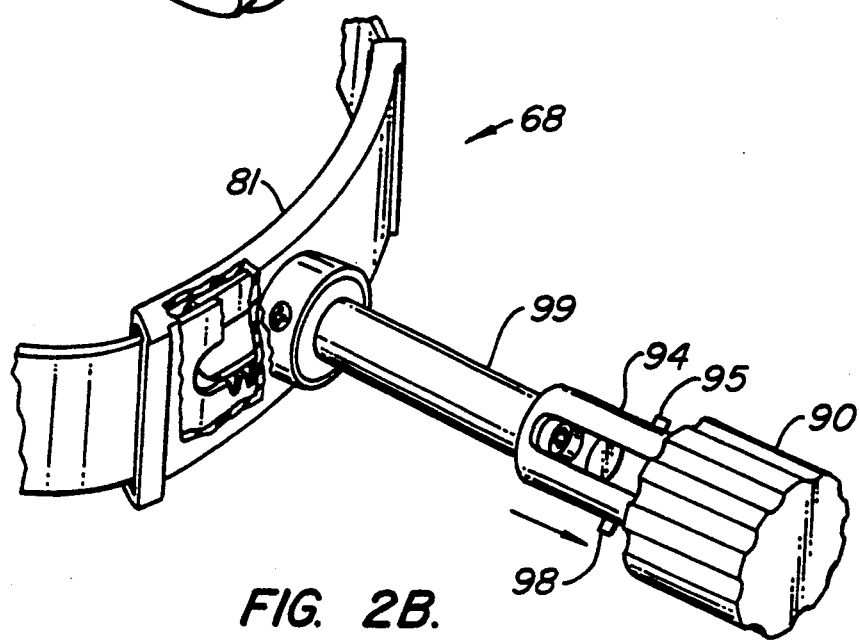
FIG. 2B is a partially cutaway view of the adjusting mechanism of the apparatus of FIG. 1.

As shown in FIGS. 2-3, rear segment 68 of the headband 66 comprises right end 73 and left end 74 (looking from the rear of the helmet 10 to the front) that overlap each other such that the diameter of the headband 66 can be varied,. The two ends 73, 74 contain grooves 76, 77 and cogs 78, 79 78 disposed along the bottom half of the groove. Sleeve 81 fits over the rear segment 68 and comprises cogwheel 83 with teeth 84 that fit into the grooves 76, 77 of the two ends 73, 74 and engages the cog 78. Thus, the two ends 73, 74 of the headband 66 are movably coupled to each other such that turning the cogwheel 83 will cause ends to move laterally.

The headband 66 can be adjusted by external knob 90 mounted exterior to the helmet 10 on the back surface. The external knob 90 is coupled to tube 94 that comprises two slots 91, 92 on opposite sides of the tube 94. The two slots 91, 92 on the tube 94 slide over socket head cap screws 96, 97 on rotatable shaft 99 such that turning the external knob 90 applies pressure to the cap screws 96, 97 and rotates the shaft 99. The rotatable shaft 99 and the tube 94 extend through hole 101 on the back surface of the helmet 10 into the interior of the helmet 10 and the rotatable shaft 99 is coupled to the cogwheel 83. The tube 94 is provided with protrusions 95, 98 that ride on a flat surface on the inside of the helmet 10. The inner surface of the helmet 10 and the plastic cover 51 prevent the knob 90 and tube 94 from moving in relation to the helmet 10, while allowing knob 90 and tube 94 to rotate.

Turning the knob 90 rotates the cogwheel 83 and, in turn, causes the right end 73 of the headband 66 to move. As the knob 90 is turned counterclockwise, the right end 73 of the headband 66 moves away from the left end 74 such that the diameter of the headband 66 is increased (i.e. the headband loosens). Likewise, turning the knob 90 clockwise moves the right end 73 of the headband 66 toward the left end 74 such that the diameter of the headband 66 decreases (i.e the headband tightens). In this manner, the viewer can easily adjust the headband 66 without taking the helmet 10 off and without the need to reach under the helmet 10. The viewer simply turns the external knob 90 counterclockwise to loosen the headband 66. Then, he/she can put the helmet 10 on and turn the knob 90 clockwise until the headband 66 securely fits around his/her head.

The adjusting mechanism does not have to be a knob 90 coupled to a rotatable shaft 99 and a gear means as described above in order to prescribe to the general principles of the present invention. For example, the apparatus could comprise two wheels on each side of the helmet such that turning the wheels changes the diameter of the interior surface of the helmet. Preferably, the adjusting mechanism is adapted to the apparatus such that it is external to the helmet 10. Therefore, the viewer can easily adjust an engagement surface on the helmet 10 without taking the helmet 10 off his/her head.

As shown in FIG. 1, front segment 70 of the headband 66 is approximately 1 cm away from the optics system 30. The helmet 10 is configured such that adjusting the headband 66 does not substantially change this distance a between the front segment 70 and the optics system 30. It is important that this distance a remain somewhat fixed so that the image exiting the optics system 30 does not become distorted or blurred. The present invention allows the helmet 10 to be compatible with viewers of widely ranging head sizes because the viewer's eyes are always in an optimal position to clearly see the image regardless of any adjustments made to the headband 66. Further, the flexible member 69 still allows the front of the headband 66 to conform to various forehead shapes, avoiding the discomfort that could arise from a more rigid attachment.

The distance b between the back surface of the helmet 10 and the two ends 73, 74 of the headband is preferably in the range of 6 cm to 11 cm (depending on the size of the viewer's head). Although this distance b is larger than would be necessary for the adjusting means to be operative, it is important as a counterbalance. The forward position of the LCD displays 18, 20 and the optics system 30 creates a moment that weighs down the front portion 60 of the helmet 10. The drive circuitry 50, the external knob 90 and the cable 14 are positioned to counter this moment. In particular, the cable 14 exits the rear of the helmet 10 to help balance the helmet 10 on the viewer's head. Thus, the center of gravity of the entire apparatus is approximately at the midpoint of the headband 66 such that the helmet 10 is stable on the viewer's head. Otherwise, the helmet 10 would be urged forward by the Weight of the front portion 60 and could tip over onto the viewer's face.

As illustrated in FIG. 2A, the apparatus further comprises earphones 86 pivotally coupled to the side segments 69 of the headband 66. The earphones 86 pivot in three directions such that the viewer may place the earphones 86 in close proximity to his/her ears. In the preferred embodiment, the earphones 86 are Sony stereo headphones Model No. MDR-V1. However, any existing earphones that are adaptable to the helmet 10 can be used in accordance with this invention. The earphones 86 are attached to a wire that plugs into the helmet 10 and runs through the cable 14 to a sound system exterior to the helmet. Therefore, the headband 66 can be detached from the helmet 10 for maintenance purposes by unplugging the wire, separating the knob 90 from the tube 94 and removing the screws 70, 71 and the flexible member 69. The earphones 86 are coupled to the top portion 72 of the headband 66 and move toward and away from the viewer's ears as the headband 66 is adjusted. Thus, the viewer automatically positions the earphones 86 in an optimal position when he/she adjusts the headband 66 with the external knob 90.

The cable 14 connects the helmet 10 to a power supply (not shown), position sensor controller (discussed below), two image generators 12 (one for each eye), and the sound system. The cable 14 enters the hole 16 in the lower back portion of the helmet 10 to minimize any restriction on the viewer's movement. This enhances the realism of the computer generated image because the viewer will not feel confined by various wires and other attachments. In addition, the cable 14 weighs 13 oz. or 0.37 kg. which is almost 20% of the weight of the entire apparatus. Therefore, the location of the cable 14 significantly contributes to balancing the helmet 10 such that the center of gravity is approximately at the midpoint of the headband 66. Power switch 110 mounted to the outer back surface of the helmet 10 turns the device on and off.

Figure 4:
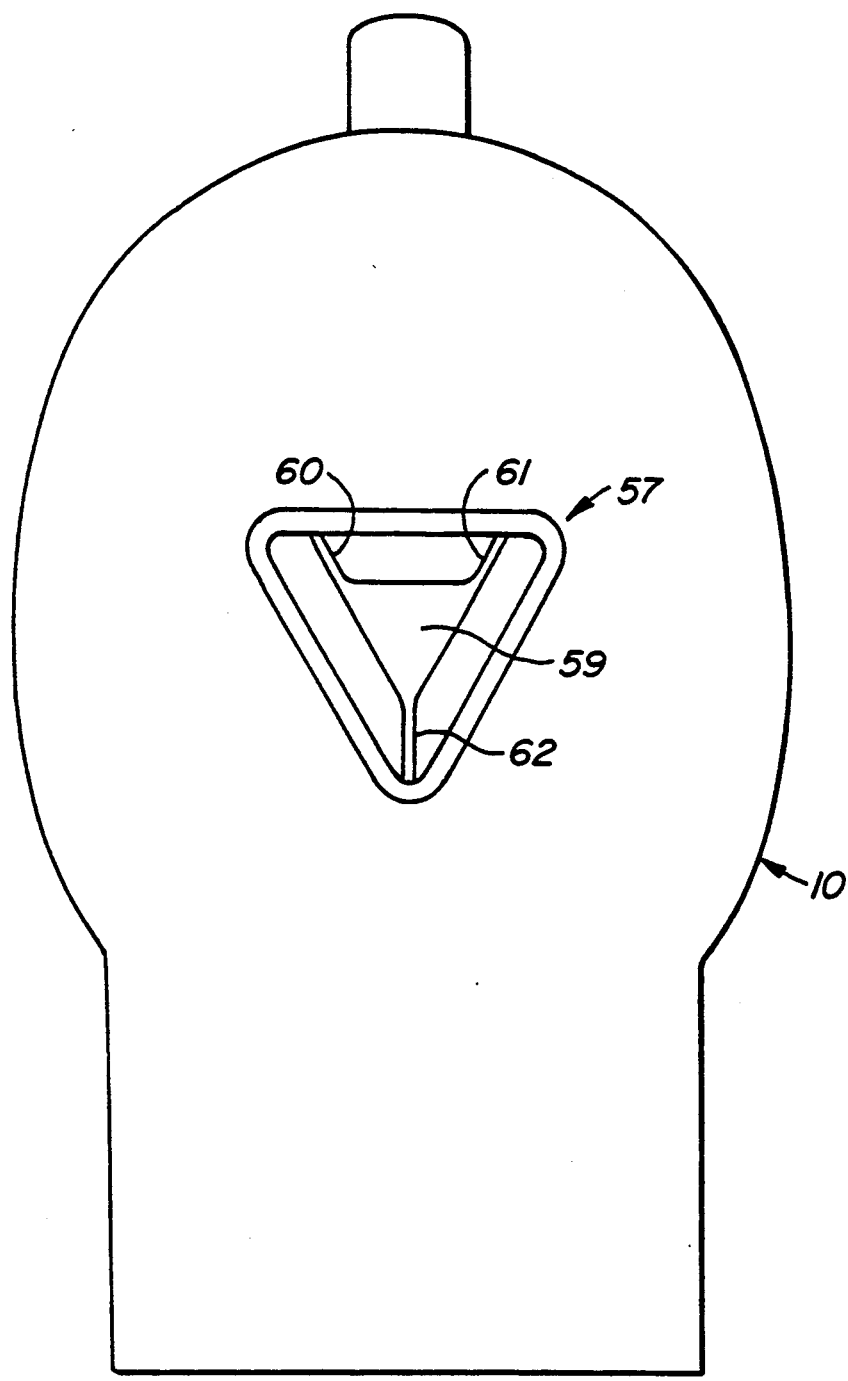
FIG. 4 is a top view showing a partially cutaway view of the apparatus of FIG. 1.

As shown in FIG. 4, triangular opening 57 in the top surface of the helmet 10 is shaped to accommodate the position sensor 40. As discussed below, different types of position sensors 40 can be placed into the triangular opening 57 depending on the application such as acoustic sensors, and the like. Support segment 59 on the interior side of the triangular opening 57 comprises two rear arms 60, 61 and one front arm 62 mounted to the interior surface of the helmet 10. A position sensor 40 can be loaded onto the support segment 59 in any manner that will ensure that the position sensor 40 remains fixed to the helmet 10.

The head position sensor 40 tracks the position and orientation of the helmet 10 (the viewer's head) and comprises a receiver 40 mounted in triangular opening 57, a transmitter (not shown) located exterior to the helmet 10, and a position sensor controller (not shown) connected to the receiver via a cable that runs through the hole 16 in the back of the helmet 10. In the preferred embodiment, an ultrasonic sensor, the Logitech 3-D Head Tracker (sold in a kit labeled "Logitech 2D/6D developer kit"), is employed. However, any suitable known head/helmet orientation and position sensor may be used in the present invention such as the Ascension Bird, the Polhemus 3space Isotrack or a gyroscopic orientation sensor.

The image generator 12 receives signals from the position sensor 40 and converts the signals to orthogonal coordinates in which the display positions and boundaries are defined. The image generator 12 then generates a "new view" based on where the viewer is now looking and determines the boundaries of what the eye could actually see in reality, only allowing the image within this boundary to be shown on the display. However, the invention is not limited to a fully enclosed image. For example, the head-mount of the present invention could be adapted to a see-through design in which the computer generated image is superimposed upon the real environment.

In the preferred embodiment, a modified version of Sony Watchman Model No. FDL310 is used to display the image to the viewer. However, any known circuit system for performing this function can be used, the helmet 10 of the present invention being adaptable to a variety of such circuitry. The Sony Watchman is modified in a manner that will adapt it to the helmet 10 of the present invention. The LCD displays 18, 20 are separated from the drive circuitry 50 so that the display system can be housed in rectangular front section 60 of the helmet 10 and the drive circuitry 50 can be placed towards the rear of the helmet 10 (for stability as described above). In a Sony Watchman, the LCD displays 18, 20 comprise a short (about 5 cm) length of flat flex cable (metal traces sandwiched between layers of polyimide or other dielectric material). Additional flat flex cable 22 is spliced between the LCD displays 18, 20 and the drive circuitry 50 and taped to the top inside surface of the helmet 10. In the preferred embodiment, the display system comprises two color LCD displays 18, 20, one for each eye, with a pixel count of 360×240. However, any type of display system may be used with the present invention such as cathode ray tubes.

The optics system 30 magnifies the pictures on the LCD displays 18, 20 to present a virtual image about 40 cm in front of each of the viewer's eyes. In the preferred embodiment, Leep Optics Model ARV-1 manufactured by Leep Systems is employed. This optics system 30 provides flexibility for viewers with different pupil widths and provides a field of view of approximately 75 degrees for each eye with a combined field of view of 90 degrees. The optics system 30 further comprises diffuser 36 to slightly blur the image and, thus, remove the sharp edges caused by the pixels in the LCD displays 18, 20. Any of the following diffusers may be employed: acetate film, acrylic sheet with frosted surface, cellophane film, copy transfer film, fresnel prism sheet material, frosted mylar film, nylon film, polyester decal material, sand blasted acrylic sheet, sanded acrylic sheet, scotch tape, vellum sheet, vinyl decal material or wax paper.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

We claim:
1. A head-mounted visual display apparatus comprising:
    a helmet comprising a shell and a headband including an engagement surface for a viewer's head;
    an adjustment mechanism mounted exterior to the shell for adjusting a size of the engagement surface comprising:
        a knob mounted to an exterior surface of the shell;

a rotatable shaft coupled to the knob and extending through a hole in the shell from the exterior surface to an interior portion of the shell; and a gear movably coupled to the engagement surface and rotatably coupled to the rotatable shaft such that rotation of the rotatable shaft adjusts the size of the engagement surface;

an image generator for generating an image; and a video display housed within the helmet and connected to the image generator for displaying the image.

2. An apparatus according to claim 1 wherein the helmet further comprises a top surface, the top surface covering a top portion of a viewer's head such that the top portion of the viewer's head is enclosed within the helmet.

3. An apparatus according to claim 1 wherein the helmet comprises at least one opening in a top surface of the helmet.

4. An apparatus according to claim 1 wherein the headband includes a front segment that conforms to a viewer's forehead, the front segment configured such that a distance between the front segment of the headband and the video display does not substantially change when the diameter of the headband changes.

5. An apparatus according to claim 1 wherein the apparatus further comprises a sensor coupled to the helmet for sensing a position and an orientation of the helmet.

6. An apparatus according to claim 5 wherein the image that is created by the image generator represents a simulated view in a direction corresponding to the position and the orientation of the helmet.

7. An apparatus according to claim 1 wherein the headband includes a rear segment, the rear segment comprising a left end and a right end.

8. An apparatus according to claim 7 wherein the gear includes a cogwheel movably coupled to the left and right ends of the rear segment of the headband and rotatably coupled to the rotatable shaft such that rotation of the rotatable shaft moves the right end of the rear segment in relation to the left end, thereby adjusting the diameter of the headband.

9. An apparatus according to claim 1 further including earphones pivotally coupled to the headband, wherein the earphones move from a first retracted position to a second working position for applying sound to a viewer's ears when the diameter of the headband decreases.

10. An apparatus according to claim 9 wherein the headband is removably mounted to the helmet and the video display.

11. An apparatus according to claim 9 wherein the helmet, the video display, the adjustment mechanism, and the earphones have a combined weight of less than 4 lbs.

12. An apparatus according to claim 11 wherein the weight of the apparatus is centered approximately around the center of the headband.

* * * * *

UNITED STATES PATENT AND TRADEMARK OFFICE
CERTIFICATE OF CORRECTION

PATENT NO. : 5,321,416

DATED      : June 14, 1994

INVENTOR(S) : BRUCE R. BASSETT, Sunnyvale, Calif.

It is certified that error appears in the above-identified patent and that said Letters Patent is hereby corrected as shown below:

On the title page at "[75] Inventors:" please delete "KENNETH PIMENTEL, Sausalito, and PETER A. RONZANI    Los Gatos, Calif." as inventors.

Signed and Sealed this

Thirteenth Day of September, 1994

Attest:

BRUCE LEHMAN

*Attesting Officer*    *Commissioner of Patents and Trademarks*